(12) United States Patent
Kovarik

(10) Patent No.: US 6,330,329 B1
(45) Date of Patent: Dec. 11, 2001

(54) METHOD AND APPARATUS WITHIN A SWITCH FOR PERFORMING CIRCULAR HUNTS WITH A WINDOW

(75) Inventor: Kenneth David Kovarik, Clayton, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/150,314

(22) Filed: Sep. 9, 1998

(51) Int. Cl.$^7$ ........................................... H04M 3/00
(52) U.S. Cl. .................. 379/333; 379/137; 379/220.01; 379/221.01; 379/337
(58) Field of Search .................. 379/219, 221, 379/242, 248, 269, 137, 220.01, 221.01, 221.06, 333, 335, 337

(56) References Cited

U.S. PATENT DOCUMENTS

| | | | |
|---|---|---|---|
| 3,576,398 | * 4/1971 | Dejean et al. | 379/137 |
| 3,639,702 | * 2/1972 | Thompson | 379/137 |
| 3,662,349 | * 5/1972 | Barlett et al. | 713/600 |
| 3,760,118 | * 9/1973 | Horenkamp et al. | 379/384 |
| 4,486,626 | * 12/1984 | Kohler | 379/196 |
| 4,747,130 | * 5/1988 | Ho | 379/269 |
| 4,759,049 | * 7/1988 | Mangini | 379/22 |
| 5,418,967 | * 5/1995 | Simcoe et al. | 710/241 |
| 5,420,909 | * 5/1995 | Ng et al. | 455/426 |
| 5,559,877 | * 9/1996 | Ash et al. | 379/201.05 |
| 5,590,176 | * 12/1996 | Agarwal et al. | 379/221 |
| 6,069,949 | * 5/2000 | Schuenhoff et al. | 379/242 |

* cited by examiner

Primary Examiner—Ahmad Matar
Assistant Examiner—Bing Bui

(57) ABSTRACT

Method and apparatus for performing circular hunts within a switch. Only a limited number of trunk groups are searched in a PSTN switch which has large numbers of trunks available. Additionally, the starting point of the search varies among the trunk groups. This search method is called a circular hunt with window. The invention limits the amount of time and resources spent searching for available call routes and more efficiently distributes traffic across trunk groups.

12 Claims, 5 Drawing Sheets

FIG. 2
PRIOR ART

| RTE List | | Channel | | | | | | | | | | | | | | | | | | | | | | | |
|---|---|---|---|---|---|---|---|---|---|---|---|---|---|---|---|---|---|---|---|---|---|---|---|---|---|
| Trk Grp | DS-1 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 |
| PRI 1 | 1 | ◇* | * | * | * | * | * | * | * | * | * | * | * | * | * | * | * | * | * | * | * | * | * | * | D |
| PRI 2 | 1 | * | * | * | * | * | | * | * | * | * | * | * | * | * | * | * | * | * | | * | | | | D |
| PRI 3 | 1 | * | * | * | * | * | * | * | | * | * | | * | * | * | | * | | * | | | | | | D |
| PRI 4 | 1 | * | * | * | | * | * | * | | * | | * | * | * | | | | * | | | | * | | | D |
| PRI 5 | 1 | * | * | * | * | | * | | * | | | | | * | | * | | | | | | | | | |
| PRI 5 | 2 | * | * | * | | | | | * | | | | | | | | | | | | | | | | |
| PRI 5 | 3 | | | * | * | | | | * | | | | | | | | | | | | | | | | |
| PRI 5 | 4 | | * | | | | | | | | | | | | | | | | | | | | | | D |
| PRI 6 | 1 | | | | | | | | | | | | | | | | | | | | | | | | D |

FIG. 5

| RTE List | | Channel | | | | | | | | | | | | | | | | | | | | | | | |
|---|---|---|---|---|---|---|---|---|---|---|---|---|---|---|---|---|---|---|---|---|---|---|---|---|---|
| Trk Grp | DS-1 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 |
| PRI 1 | 1 | | | | | * | | * | | * | * | | | * | | | | * | * | | | | | | D |
| PRI 2 | 1 | * | * | * | * | | * | | | * | | | * | | * | | * | | | * | | | | | D |
| PRI 3 | 1 | | | * | * | | * | | * | * | | * | * | | * | * | | * | | | * | | | * | D |
| PRI 4 | 1 | * | | * | * | * | | * | * | | | * | * | * | * | * | * | | * | * | * | * | * | * | D |
| PRI 5 | 1 | * | | * | * | * | * | | * | * | * | * | | * | * | * | * | | * | * | * | * | * | * | * |
| PRI 5 | 2 | * | * | | | | | | | | | | | ◇ | | | | | | | * | | | | |
| PRI 5 | 3 | | | | | * | | | | | | | | * | | | | | | | | | | | |
| PRI 5 | 4 | | * | | | | | | | | | | * | | | | | * | | | | | | | D |
| PRI 6 | 1 | | | | | | | | * | | | | | | | * | | * | | | | | | | D |

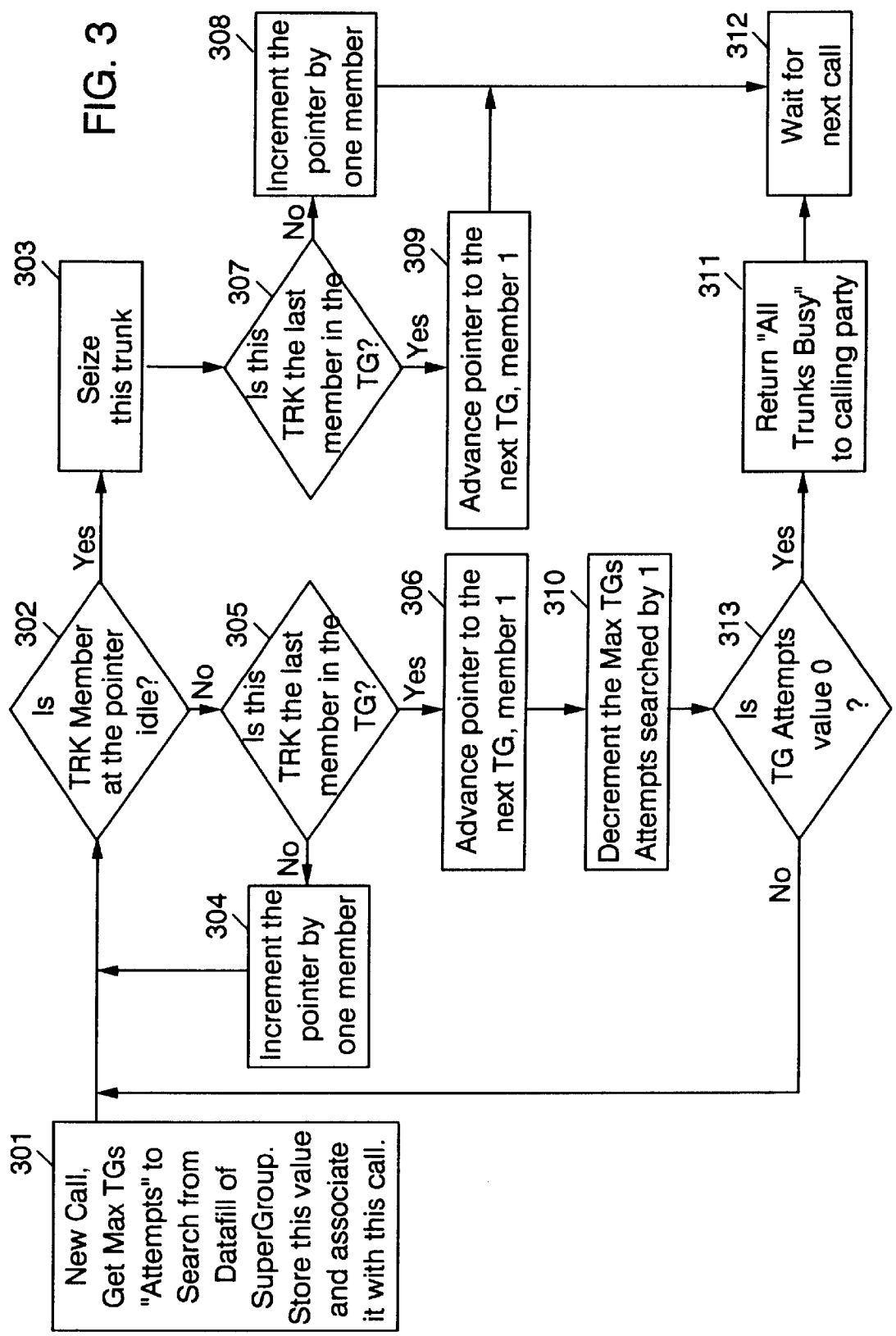

METHOD AND APPARATUS WITHIN A SWITCH FOR PERFORMING CIRCULAR HUNTS WITH A WINDOW

BACKGROUND

1. Field of the Invention

This invention is related to managing trunk traffic in a telecommunication switch. In particular, this invention involves performing circular hunts for an idle trunk member. With this invention, circular hunts are performed in such away as to reduce the amount of search time and to more evenly distribute traffic across large numbers of trunk groups. The invention supports very large trunk groups that might otherwise encounter trunk timeout, or other conditions before a final disposition of a call is determined. The invention enforces a maximum number of trunk groups or routes searched on a per call basis such that trunk timeout or other anomalies are avoided by returning an all trunks busy condition if no idle members are found within the number of trunks or routes searched.

2. Description of the Problem Solved

The public switched telephone network (PSTN) consists of many switches interconnected by trunks. The trunks which interconnect the switches of the PSTN include multiple trunk groups, each trunk group having many members which can carry calls. Which trunk group is available to a specific call determines the route that the call will take to get to its destination. When a switch handles a call, it must search for an available route, that its, a trunk group with an available channel or member. One type of search used to find a route is called a "circular hunt," because it can be depicted graphically as a pointer moving around a circle on which the various trunk groups, or available routes, are shown around the circumference of the circle, as shown in FIG. 1, where the pointer indicates the current route. When a large number of trunk groups, routes, or channels is involved, a search of this or any type places a burden on the processing resources of the switch which results in a delay until the call can be completed.

With greatly increasing demand being placed on the PSTN, larger and larger numbers of trunk groups are connected to the various switches which make up the PSTN. Much of this demand is due to the growth of the Internet, and many of the trunk groups are connected to Internet access devices. The number of trunk groups can be so large that internal switch limitations can cause software errors and/or trunk timeouts if a free channel or member of a trunk group is not found quickly. Additionally, the usage of the various trunk groups is not evenly distributed, resulting in wasted resources. This problem is illustrated in FIG. 2. A trunk group is also called a route (RTE). FIG. 2 is a table which illustrates the problem in more detail for an ascending sequential search algorithm. A star indicates a particular channel or member of a particular trunk is in use. In this case the trunks are integrated services digital network (ISDN) primary rate interfaces (PRI). Note the upper channels of the higher numbered trunks are not being used at all. The diamond over trunk group PRI 1/channel 1 indicates where the search algorithm always starts in an ascending sequential search algorithm of the prior art. Traffic must fill all channels in PRI 1 before the algorithm searches PRI 2. PRI 2 must be completely filled before PRI 3 is used. The result is that trunk groups placed later in a route list are used much less frequently than trunk groups that are early in the route list. The DS-1 column indicates that a trunk group may have multiple DS-1's, or digital signalling-1 trunks, in the trunk group and is not limited to 23 bearer channels. For this illustration PRI with 23 channels plus one D (signaling channel) is used; as well as the scenario where for PRI 5 four DS-1's are used and two D (signaling) channels are used. One D channel is active and one is on standby (or backup). What is needed is a way to limit the number of trunk groups searched, while still insuring even distribution of traffic.

SUMMARY

The present invention solves the above problems by providing a search of only a limited number of trunk groups, and by varying the starting point of a circular hunt each time a new call needs a route. I call this type of search a "circular hunt with window." The initial maximum number of trunk groups searched, called a maximum trunk group attempt value, can be selected by a network designer of ordinary skill in the art who has become familiar with the invention. The invention limits the amount of time and resources spent searching for available routes and more efficiently distributes traffic across the available trunk groups. At the same time, the probability of finding an idle trunk is high enough so that the number of "all trunks busy" (ATB) conditions returned is limited.

According to the present invention, an initial maximum trunk group attempt value is associated with each new call. The switch initially determines if the trunk group member at the search pointer is idle. If the trunk group member at the pointer is not idle, the switch advances the pointer to the next trunk group member. In the trunk group member is in another trunk group, the maximum trunk group attempt value is decremented. As soon as a trunk group member at the pointer is idle, the switch seizes the trunk group member at the pointer but still advances the pointer so that the next hunt will start at the next trunk group member. If the maximum trunk group attempt value reaches zero, the switch returns an ATB signal. Throughout this disclosure, I illustrate the invention using clockwise circular hunts, but the invention is equally applicable to counter-clockwise hunts.

The invention is typically implemented using a computer program product for the switch involved. A computer program product includes a media with computer program code which causes the switch involved to perform the necessary operations. A switch which implements the invention includes a switching matrix, one or more peripheral modules connected to the switching matrix, one or more input/output devices connect the switching matrix, and a processor core which controls the operation of the switch and, during operation, contains the computer program code which implements the invention. In many cases, a switch with a large number of trunk groups is connected to an Internet access device.

DESCRIPTION OF THE DRAWINGS

FIG. 2 is a table showing trunk group utilization when large numbers of trunk groups are managed using the ascending sequential search methods of the prior art.

FIG. 3 is a flow chart which illustrates the search method of the present invention.

FIG. 5 is a table which illustrates the utilization of trunk groups when the present invention is employed.

DETAILED DESCRIPTION OF SOME PREFERRED EMBODIMENTS

FIG. 3 is a flow chart which illustrates the method of the present invention. At 301 a new call arrives which requires a trunk member for delivery. At this point an initial maximum trunk group attempt value is associated with the call. A search or "hunt" from a datafill of a "supergroup" is performed with this value. A datafill allows a craftsperson to associate multiple trunk groups with a routing path such as a telephone number. Switches typically support many trunk searching algorithms. A supergroup pergroup is a group of trunks larger than the search window, a mechanism that is key to this invention. At 302 a determination is made as to whether the trunk group member at the pointer is idle. If the member is idle, there is no need to search further and the trunk is seized at 303. At 307 a determination is made as to whether this member is the last member in the trunk group. If not, the search pointer increments by one member at 308. If so the pointer is moved the next trunk group at 309.

If the initial trunk group member is not idle a check is made a 305 as to whether the member is the last member in the trunk group. If the member is the last member, the pointer is advanced to the next trunk group at 306 and maximum trunk group attempt value is decremented by one at 310. If this member is not the last member in the trunk group, the pointer is simply incremented by one at 304 and a member is checked at 302. When the maximum trunk group attempt value reaches 0 at 313, an all trunks busy (ATB) signal is generated at 311. In any case the process is complete 312, and the switch waits for the next call.

At the startup of a new supergroup, the pointer is set to trunk group 1, member 1. The pointer advances to the next trunk group in the supergroup when the last member of the previous trunk group has been checked. When the last trunk group in the list is checked, the search pointer advances to the first trunk group in the list. Instead of starting each circular hunt over again at the first trunk group, each hunt begins where the last search left off. This ensures that traffic is evenly distributed across trunk groups by effectively searching a floating window of trunks where the maximum number of trunk groups searched in each hunt is less than the total number of available trunk groups.

Figure 1:
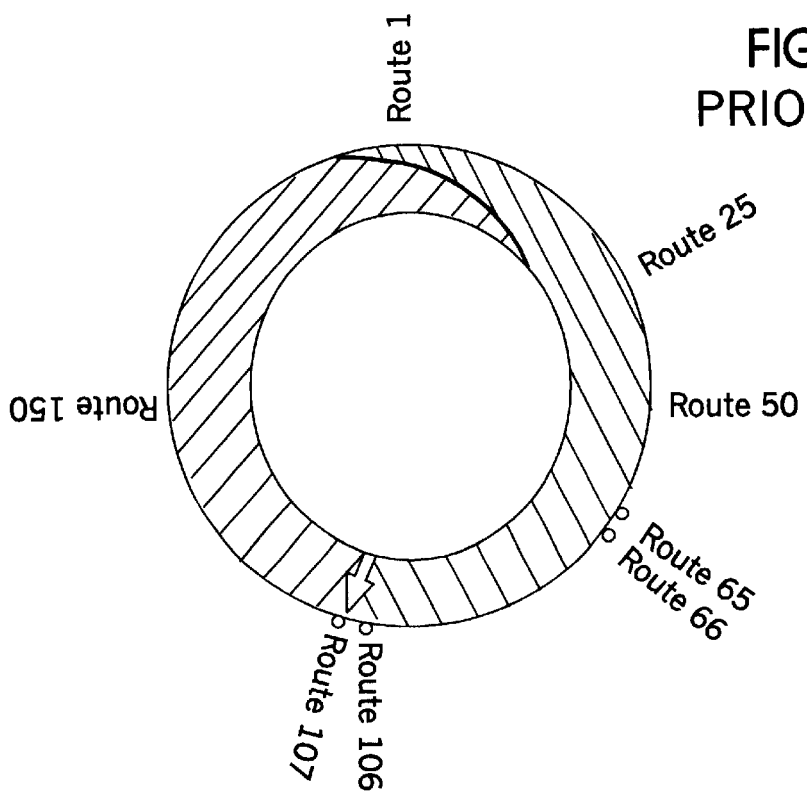
FIG. 1 is a schematic illustration of a circular hunt of the prior art.
Figure 4:
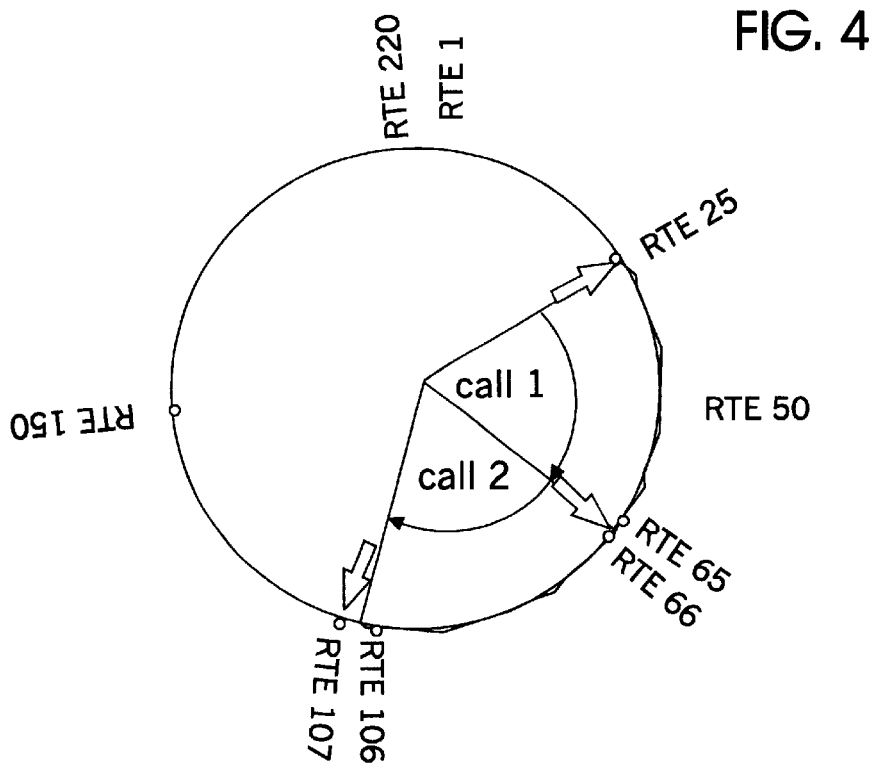
FIG. 4 is a schematic illustration of the circular hunt with window according to the present invention.

FIG. 4 schematically illustrates the concept of the circular hunt with window. For the first call, the search algorithm starts at trunk group, or route (RTE) 25, channel 1 and finds no trunks idle through route 65 channel 23. At this time the caller is given ATB treatment. The next caller begins a hunt at route 66 channel 1. If no trunks are found idle, ATB treatment is provided at Route 106, channel 23 with the next hunt beginning at Route 107. This algorithm prevents a hunt from going through 220 trunk groups before establishing an ATB condition. Since the window continuously moves, the algorithm also evenly distributes traffic across all trunk groups.

FIG. 5 shows a table which illustrates usage when the circular hunt with window of the present invention is employed. As before, stars indicate trunk group members in use. FIG. 5 contrasts with FIG. 2 where an ascending sequential algorithm was used. By using a circular hunt with a window, a more even usage of channels can be obtained. Notice that the diamond in FIG. 5 is dynamically moving with the circular hunt to be either at the member plus one which was given the last call, or where an all trunks busy determination was made.

Figure 6:
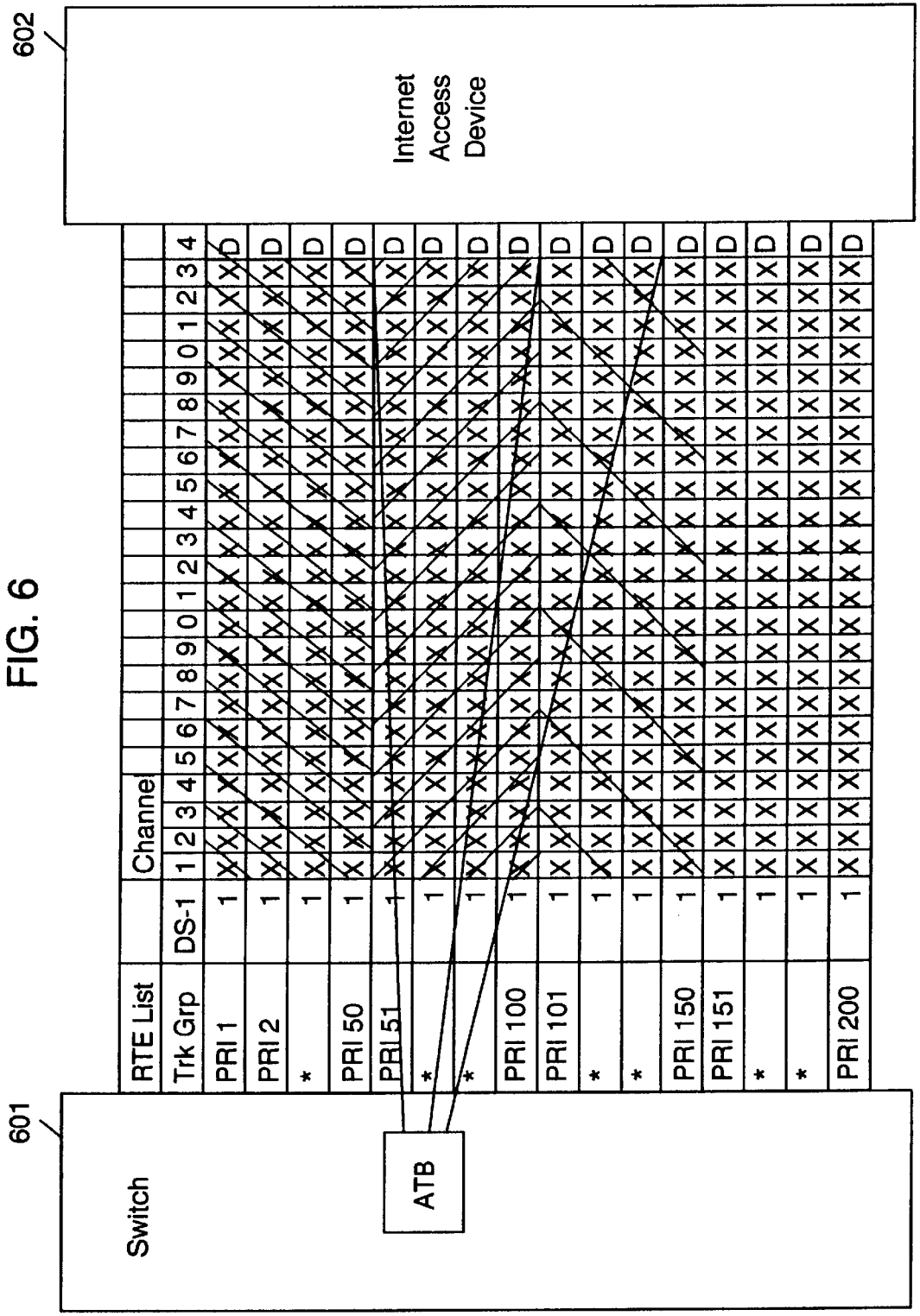
FIG. 6 is a network diagram which shows a switch which is implementing the present invention connected by a large number of trunk groups to an Internet access device.

FIG. 6 illustrates a portion of the network in which a switch 601 which implements the present invention is connected to an Internet access device 602. A large number of trunks connects the switch to the Internet access device. The trunk groups are depicted with a large table, which illustrates how the invention operates in this type of configuration. In a large configuration where all the trunks in a trunk group are indeed busy, resources are not wasted searching all 200 or more trunk groups for each and every call. In this case, the search window limits the searches to a subset of the entire route list. For example, in a 200 trunk route list, with a window of 50 trunk groups with all trunks busy, the entire route list would be searched in four call attempts. This limiting of searches is especially advantageous with internet configurations like that illustrated in FIG. 6, which sometimes have less trunks available than demand might dictate.

Figure 7:
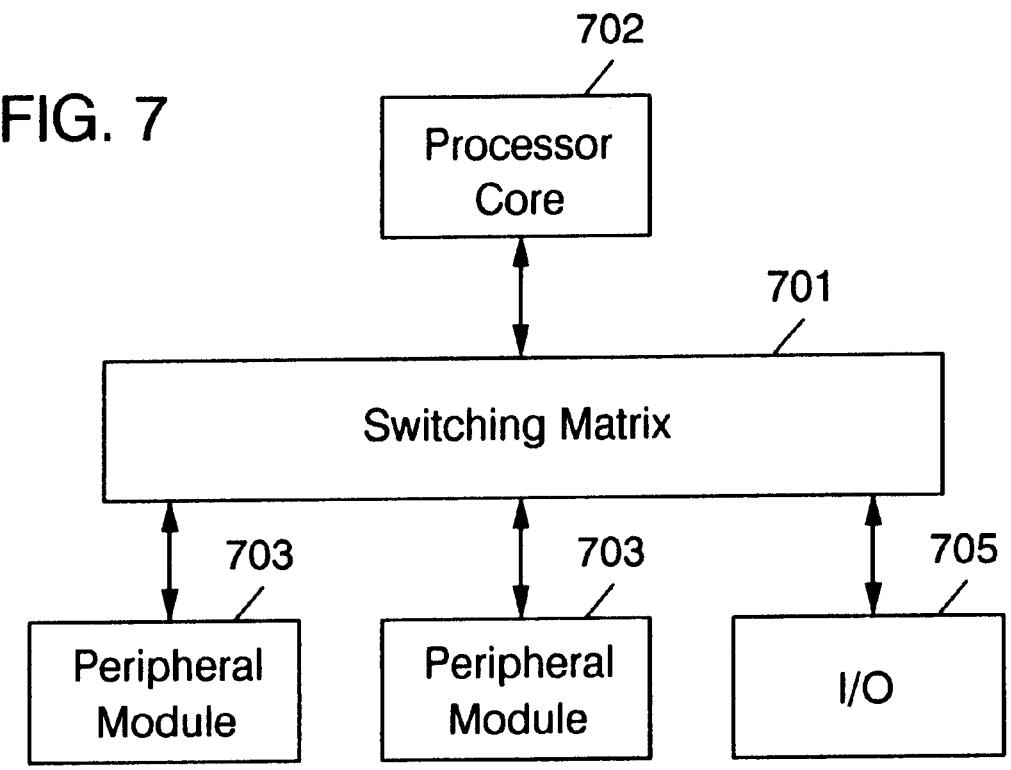
FIG. 7 is a block diagram of a switch which implements the present invention.

FIG. 7 illustrates a conceptual, functional block diagram of a switch which implements the invention. Processor core 702 includes a central processing unit, memory, and supporting circuitry. This processor core, together with any computer program code stored in memory is the means for controlling the overall operation of the switch or service node. Switching matrix 701 allows the processing core to communicate with the other components. The switching matrix 701 includes one or more buses and accompanying internal circuitry. Input/output (I/O) module 705 is also connected to the switching matrix and includes removable media devices to load computer program code. The I/O module also includes devices for connection to workstations and similar equipment. The peripheral modules 703 are connected to the switching matrix 701 and are managed by the processor core 702. The peripheral modules 703 provide an interface to various parts of the network and include various types of line interfaces, as well as the interfaces to the trunk groups which are the subject of the present invention.

Figure 8:
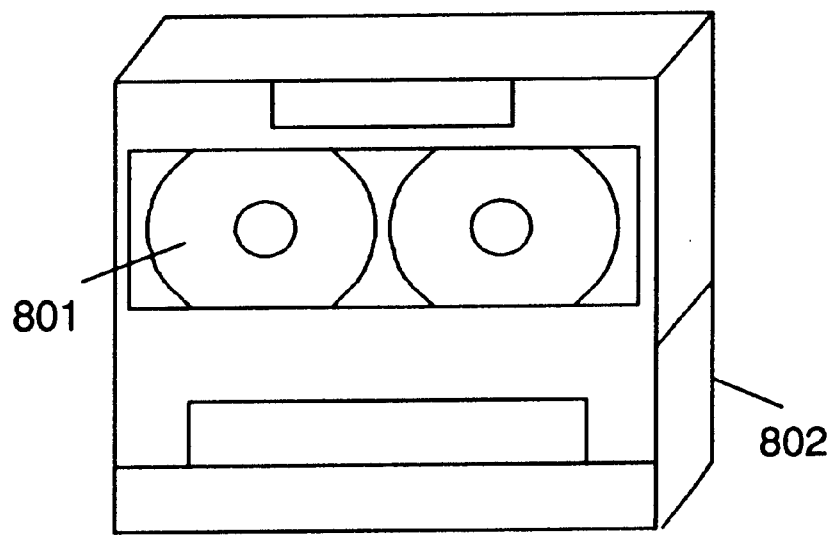
FIG. 8 illustrates an example of a media on which computer program code which implements the present invention is stored.

Appropriate computer program code in combination with hardware implements many of the elements of the present invention. This computer program code is often stored on storage media. This media can be a diskette, hard disk, CD-ROM, or tape. The media can also be a memory storage device or collection of memory storage devices such as read-only memory (ROM) or random access memory (RAM). Additionally, the computer code can be transferred to the switch over some type of data network. FIG. 8 illustrates one example of a media. FIG. 8 shows a tape cartridge of the type where magnetic media 801 is enclosed in a protective cassette 802. Magnetic field changes over the surface of the magnetic media 801 are used to encode the computer program code. In this way the computer program code is stored for transport and later retrieval.

I have described specific embodiments of my invention which provides for a circular hunt with a window for finding idle trunks within a switch. One of ordinary skill in the networking and computing arts will quickly recognize that the invention has other applications in other environments. In fact, many embodiments and implementations are possible. The following claims are in no way intended to limit the scope of the invention to the specific embodiments described.

I claim:

1. A method in a switch for performing a hunt for a free trunk group member, the method comprising the steps of:

associating a maximum trunk group attempt value with a new call that is less that a number of trunks that can be searched;

determining if a trunk group member at a pointer is idle;

if the trunk group member at the pointer is not idle and the maximum trunk group attempt value is greater than zero, advancing the pointer to the next trunk group member;

if the next trunk group member is in another trunk group, decrementing the maximum trunk group attempt value; and if the trunk group member at the pointer is idle, seizing the trunk group member at the pointer and advancing the pointer so that the next hunt will start at the next trunk group member.

2. The method of claim 1 further comprising the step of returning an all-trunks-busy (ATB) signal if the trunk group at the pointer is not idle and the maximum trunk group attempt value is equal to zero.

3. A computer program product for hunting for a free trunk member within a switch, the computer program product having a medium with a computer program embodied thereon, the computer program comprising:

computer program code for associating a maximum trunk group attempt value with a new call that is less that the number of trunks that can be searched;

computer program code for determining if a trunk group member at a pointer is idle;

computer program code which, if the trunk group member at the pointer is not idle and the maximum trunk group attempt value is greater than zero, advances the pointer to the next trunk group member;

computer program code which, if the next trunk group member is in another trunk group, decrements the maximum trunk group attempt value; and computer program code which, if the trunk group member at the pointer is idle, seizes the trunk group member at the pointer and advancing the pointer so that the next hunt will start at the next trunk group member.

4. The computer program product of claim 3 wherein the computer program code further comprises computer program code for returning an all-trunks-busy (ATB) signal if the trunk group at the pointer is not idle and the maximum trunk group attempt value is equal to zero.

5. Apparatus which performs circular hunts for free trunk group members comprising:

a switching matrix;

one or more peripheral modules connected to the switching matrix, at least one of the peripheral modules connected to a trunk group;

one or more input/output devices connected to the switching matrix; and means for performing circular hunts for free trunk group members so that the relative starting point for each circular hunt for an idle trunk member varies over time by associating with each new call a maximum trunk group attempt value that is less than a number of trunks groups that can be searched, advancing the pointer if a trunk group member is not idle and the maximum trunk group attempt value is greater than zero and by advancing a pointer, once an idle trunk has been seized, so that the next hunt will start at the next trunk group member, the means for performing circular hunts connected to the switching matrix.

6. The apparatus of claim 5 wherein the trunk group is connected to an Internet access device.

7. A switch which performs circular hunts for free trunk group members, the switch comprising:

a switching matrix;

one or more peripheral modules connected to the switching matrix, at least one peripheral module connected to a trunk group;

one or more input/output devices connected to the switching matrix; and a processor core connected to the switching matrix, the processor core for controlling the operation of the switch, the processor core containing a computer program comprising computer program code for associating a maximum trunk group attempt value with a new call that is less that a number of trunks that can be searched, computer program code for advancing the pointer to the next trunk group member and decrementing the maximum attempt value, and computer program code for seizing the trunk group member at the pointer and advancing the pointer so that the next hunt will start at the next trunk group member.

8. The switch of claim 7 wherein the trunk group is connected to an Internet access device.

9. Apparatus for performing a hunt for a free trunk group member, the method comprising the steps of:

means for associating a maximum trunk group attempt value with a new call that is less that a number of trunks that can be searched;

means for determining if a trunk group member at a pointer is idle;

means for advancing the pointer to the next trunk group member if the trunk group member is not idle and the maximum trunk group attempt value is greater than zero;

means for decrementing the maximum trunk group attempt value when the pointer advances to the next trunk group; and means for seizing the trunk group member at the pointer and advancing the pointer so that the next hunt will start at the next trunk group member.

10. The apparatus of claim 9 further comprising means for returning an all-trunks-busy (ATB) signal if the trunk group at the pointer is not idle and the maximum trunk group attempt value is equal to zero.

11. A network comprising:

a switch which performs circular hunts for free trunk group members, the switch including a switching matrix, one or more peripheral modules connected to the switching matrix, and means for performing circular hunts for free trunk group members so that the relative starting point for each circular hunt for an idle trunk member varies over time by associating with a new call a maximum trunk group attempt value that is less than a number of trunks groups that can be searched, advancing the pointer if a trunk group member is not idle and the maximum trunk group attempt value is greater than zero and the means for performing circular hunts connected to the switching matrix, an internet access device; and a trunk group disposed between the internet access device and the switch, the trunk group having trunk group members assigned to calls by the means for performing circular hunts.

12. A network comprising:

a switch which performs circular hunts for free trunk group members, the switch including a switching matrix, one or more peripheral modules connected to the switching matrix, and a processor core connected to the switching matrix, the processor core for controlling the operation of the switch, the processor core containing a computer program comprising computer program code for associating a maximum trunk group attempt value with a new call that is less than a number of trunks that can be searched, computer program code for advancing the pointer to the next trunk group member and decrementing the maximum trunk group attempt value, and computer program code for seizing the trunk group member at the pointer and advancing the pointer so that the next hunt will start at the next trunk group member;

an internet access device; and a trunk group disposed between the internet access device and the switch, the trunk group having trunk group members assigned to calls by the computer program.

* * * * *